(12) United States Patent
Krutak, Sr. et al.

(10) Patent No.: US 6,174,400 B1
(45) Date of Patent: Jan. 16, 2001

(54) NEAR INFRARED FLUORESCENT SECURITY THERMAL TRANSFER PRINTING AND MARKING RIBBONS

(75) Inventors: James John Krutak, Sr.; Michael John Cyr; Nelson Zamora Escano; Horst Clauberg; Barbara Crawford Jackson; Tony Wayne Helton, all of Kingsport, TN (US)

(73) Assignee: Isotag Technology, Inc., Houston, TX (US)

( * ) Notice: Under 35 U.S.C. 154(b), the term of this patent shall be extended for 0 days.

(21) Appl. No.: 08/811,311

(22) Filed: Mar. 4, 1997

Related U.S. Application Data

(60) Provisional application No. 60/012,997, filed on Mar. 7, 1996.

(51) Int. Cl.⁷ ..................................................... B41M 5/26
(52) U.S. Cl. ........................ 156/234; 156/238; 427/256; 428/195; 428/484; 428/488.1; 428/690; 428/913; 428/914
(58) Field of Search ...................................... 428/195, 484, 428/488.1, 488.4, 690, 913, 914; 156/230, 234, 238; 427/256

(56) References Cited

U.S. PATENT DOCUMENTS

| | | |
|---|---|---|
| 3,639,166 * | 2/1972 | Fellows et al. ........................ 428/327 |
| 3,663,278 * | 5/1972 | Blose et al. ........................... 428/900 |
| 4,255,273 | 3/1981 | Sakkaab . |
| 4,627,997 | 12/1986 | Ide . |
| 4,657,697 | 4/1987 | Chiang . |
| 4,816,344 | 3/1989 | Chiang . |
| 5,089,350 | 2/1992 | Talvalkar et al. . |
| 5,126,390 * | 6/1992 | Duff ...................................... 524/276 |
| 5,212,558 * | 5/1993 | Obata et al. .......................... 358/296 |
| 5,292,855 | 3/1994 | Krutak et al. . |
| 5,336,714 | 8/1994 | Krutak et al. . |
| 5,397,819 | 3/1995 | Krutak et al. . |
| 5,423,432 | 6/1995 | Krutak et al. . |
| 5,461,136 | 10/1995 | Krutak et al. . |
| 5,514,860 | 5/1996 | Berson . |
| 5,516,590 | 5/1996 | Olmstead et al. . |
| 5,525,516 | 6/1996 | Krutak et al. . |
| 5,552,231 | 9/1996 | Talvalkar et al. . |
| 5,553,714 | 9/1996 | Cushman et al. . |

FOREIGN PATENT DOCUMENTS

| | | | |
|---|---|---|---|
| 0 157 568 | 10/1985 | (EP) | ..................................... 428/195 |
| 0 420 613 | 4/1991 | (EP) | ..................................... 428/195 |
| 0 719 654 | 7/1996 | (EP) | ..................................... 428/195 |
| 3-79683 | 4/1991 | (JP) . | |
| 81 03507 | 12/1981 | (WO) | ..................................... 428/195 |
| 89 00319 | 1/1989 | (WO) | ..................................... 428/195 |

* cited by examiner

*Primary Examiner*—Bruce H. Hess
(74) *Attorney, Agent, or Firm*—Mark L. Davis; John R Casperson

(57) ABSTRACT

The present invention relates to thermal transfer ribbons comprising a ribbon backing element and at least one printing media layer comprising at least one near infrared fluorescent compound in a concentration which provides detectable fluorescence without imparting color to a mark made from said printing media layer. Methods for printing marks containing said at least one near infrared fluorescent compounds via thermal transfer and methods for reading said marks are also disclosed.

20 Claims, 5 Drawing Sheets ized or admixed into a carrier polymer/polymer backbone which is incorporated into the wax/thermoplastic resin which forms the thermally meltable ink layer (or printing media layer) on the thermal transfer ribbon.

BACKGROUND OF THE INVENTION

Thermal transfer printing media and the ribbons used for thermal transfer are well known in the art, Generally the ribbon comprises at least three main layers, a thermally meltable ink layer, a polymer film layer and a heat resistant polymer layer. The compositions of the various layers are described in JP A 3-79,683, (Apr. 4, 1991). However, thermal transfer media or ribbons capable of printing invisible marks are not disclosed.

Thermal transfer ribbons incorporating visible fluorescent dyes or pigments are disclosed in U.S. Pat. Nos. 4,627,997, 4,657,697,4,816,344, 5,089,350 and 5,552,231. Ribbons containing marking compositions, which are invisible to the human eye, are not disclosed.

Thermal transfer ribbons incorporating invisible UV dyes or pigments and visible pigments are disclosed in U.S. Pat. No. 5,516,590. However, thermal transfer ribbons incorporating invisible marking compound which are not visible to the unaided human eye, and particularly invisible near infrared fluorescent compounds are not disclosed.

SUMMARY OF THE INVENTION

The present invention relates to thermal transfer ribbons comprising a ribbon backing element and at least one printing media layer comprising at least one near infrared fluorescent compound in a concentration which provides detectable fluorescence without imparting color to a mark made from said printing media layer.

The present invention further relates to preparation of printing and marking ribbons consisting of thin film elements with printing media adhered to one side thereof.

Also disclosed is a method for applying a mark comprising at least one invisible near infrared fluorescent compound said method comprising the steps of providing a thermal transfer ribbon comprising a ribbon backing element having coated on one side at least one printing media layer comprising at least one invisible NIRF compound; and contacting the non-coated side of said ribbon backing element with a heating element so as to contact said printing media layer with a print receiving media under conditions sufficient to thermally transfer an image to said print receiving media.

Also disclosed is a method for detecting a thermal transfer mark comprising at least one invisible NIRF compound wherein said method comprises the steps of exciting said at least one invisible NIRF compound having a peak absorbance with radiation focused within 10 nm of said peak absorbance; and detecting fluorescence emitted from said invisible NIRF compound.

DESCRIPTION OF THE FIGURES

FIG. 6A is a top view of a thermally transferred bar code printed on a print receiving medium using the ribbon shown in FIG. 2 as the product identification bar code would appear under broad spectrum and/or black light.

FIG. 6B is a top view of the bar code in FIG. 6A as the bar code would appear when excited with an appropriate near infrared radiation source and imaged with a camera designed to display contrast images of the fluorescence.

DETAILED DESCRIPTION OF THE INVENTION

Figure 1:
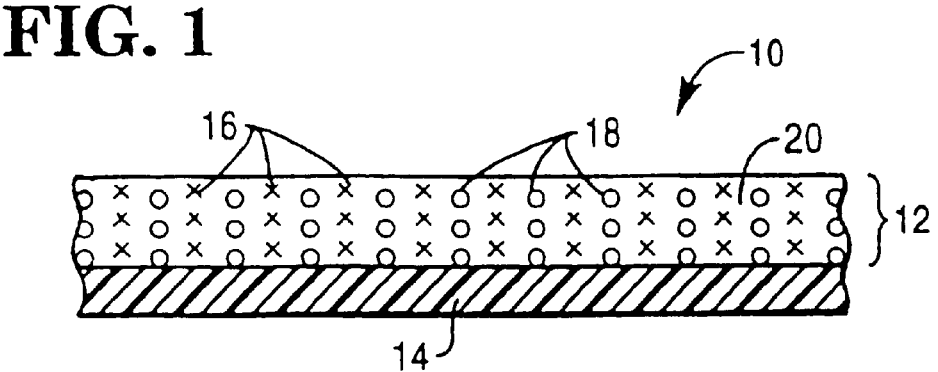
FIG. 1 is a cross-sectional side view of a thermal transfer ribbon having a single printing media layer containing both visible and invisible NIRF marking compounds.

The thermal transfer ribbons 10 of the present invention comprise at least three main layers: at least one thermally meltable ink or printing media layer 12 containing at least one NIRF compound which is adherent to one side of a polymer film layer or ribbon backing element 14 and a heat resistant polymer layer. Ribbon backing element 14 is preferably a long narrow strip of a flexible polymeric material. The ribbon backing should be compatible with printing media layer 12, have sufficient tensile strength to resist tearing and be sufficiently flexible to be wound around a spool or reel. Suitable backing materials include tissue paper, PET, PEN, a copolymer or blend of PET and/or PEN and Mylar. Preferably said backing material is Mylar, such as that available from E. I. Dupont de Nemours and Co., Inc. in Wilmington, Del.

The printing media 12 of the present invention comprises a binding substrate and at least one marking compound selected from visible marking compounds such as pigments and dyes 16 and invisible NIRF marking compounds such as compolymerized NIRF compounds and monomeric NIRF compounds 18. Thus, the term marking compound as used herein includes both visible pigments and dyes as well as compolymerized and monomeric NIRF compounds, which are invisible to the human eye.

Thermal transfer ribbons according to the present invention may include more than one printing media layer, however, at least one printing media layer must include at least one invisible NIRF compound either alone or in combination with other invisible NIRF compounds or visible marking compounds. Preferably said printing media is a uniform dispersion.

Binding substrate 20 retains the uniform dispersion of marking compounds 16 and 18 against the ribbon-backing element 14 prior to the printing operation. In addition, binding substrate 20 retains the uniform dispersion of marking compounds 16 and 18 once printing media layer 12 is transferred onto print receiving medium. Suitable binding substrates contain carnuba wax, paraffin wax, candelilla wax, palm wax, beeswax and other natural waxes or oils such as rice bran wax, gum arabic, wax compatible resins and chemicals such as poly(α-methyl styrene), epoxy resins, acrylic resins, polyethylene oxide, polytetrafluoroethylene wax, polyurethanes, polyethylene waxes, methyl methacrylate resins, styrene-ethylene-butylene block copolymers, ethylene vinyl acetate, ethylene methyl acrylate copolymers, styrene butadiene elastomers, polyketones, amorphous polyester resins, cellulose esters, polyvinyl alcohol, solid fatty acids, amides and alcohols such as 1-octadecanol, sebacic acid, stearamide, behenyl alcohol, stearyl stearamide, casein, high density polyethylene emulsion, carnuba wax emulsion, glycerine, castor oil, plasticizers, curing agents such as glycidoxypropltrimethoxy silane, n-beta-amino ethyl gammaaminopropyl ethylenediamine, defoamers such as NopcoNDW and surfynol 104.

Visible marking compounds allow the printed image to appear visibly black or colored, as desired, under broad spectrum light. Visible marking compounds include visible pigments, dyes and other colorants which are known in the art and which can be suitably dispersed in the printing media. Examples of suitable visible marking compounds 16 include carbon black pigments, green, brown, blue and other colored pigments in concentrations sufficient to impart color to the print receiving media.

Invisible NIRF marking compounds are invisible under broad spectrum light and black light but produce fluorescence or fluoresce when activated with appropriate red or near infrared light frequencies. Suitable invisible marking compounds include monomeric or copolymerized near infrared fluorescent compounds or NIRFs.

The NIRF dyes useful in the practice of the present invention and for the synthesis of NIRF polymers useful in the practice of the present invention comprise at least one porphine composition described by the formula:

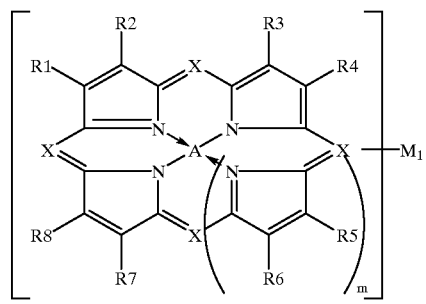

wherein each X may be the same or different and is selected from nitrogen and carbon substituted with Y, wherein Y is selected from hydrogen, $C_1-C_{12}$ alkyl, substituted $C_1-C_{12}$ alkyl, $C_3-C_8$ cycloalkyl, aryl and heteroaryl, m is 1 through 9; $R_1-R_8$ are the same or different and are selected from hydrogen, $C_1-C_{12}$ alkyl, substituted $C_1-C_{12}$ alkyl, $C_3-C_8$ cycloalkyl, aryl and heteroaryl and wherein adjacent $R_1-R_8$ groups may represent the following parts of aromatic and heteroaromatic ring systems:

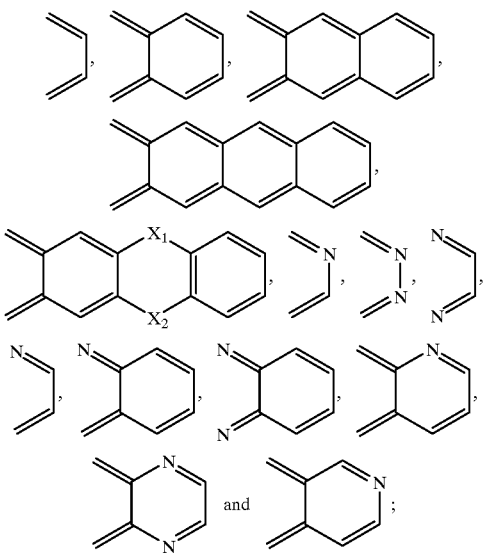

wherein $X_1$ and $X_2$ may be the same or different and are O, N; wherein A is 2(H) atoms bonded to diagonally opposite nitrogen atoms or Zn(II), Mg(II), Al(III) bonded to halogen, oxygen, sulfur or nitrogen, Sn(IV) atoms bonded to halogen, oxygen, sulfur or nitrogen, Si(IV) bonded to halogen, oxygen, sulfur or nitrogen and Ga (III) bonded to halogen, oxygen, sulfur or nitrogen and any other metal for $M_1$ which produces near infrared fluorescence such as Li, Na, K, Be, Mg, Ca, Sc, Y, La, Ac, Ti, Zr, Hf, Cr, Mo, W, Mn, Tc, Re, Fe, Ru, Os, Co, Rh, Ir, Ni, Pd, Pt, Cu, Ag, Au, Zn, Cd, Hg, In, Tl, Ge, Pb, As, Sb; lanthanides: Pr, Nd, Sm, Eu, Gd, Dy, Ho, Er, Tm, Yb, Lu; and actimides: Th, Pa U Np. S represents 1–8 substituents bearing polymer forming reactive groups (capable of producing a polymer) which may be substituted into Y or the $R_1-R_8$ groups or both.

In the case of the $R_1-R_8$ groups and Y, any nuclear position can be used which produces the desired light absorption and fluorescence properties. The scope of the $R_1-R_8$ includes symmetric and less symetric combination of ring systems designed to increase the absorption wavelengths. By designing the NIRFs with higher absorption wavelengths the color of the resultant compound is minimized.

Preferably X is 0, 2 or 4 nitrogens, more preferably 2 (diazaporphines) or 4 nitrogens (tetra azaporphines) and most preferably 4 nitrogens. Example of suitable tetra azaporphines includes, but are not limited to:

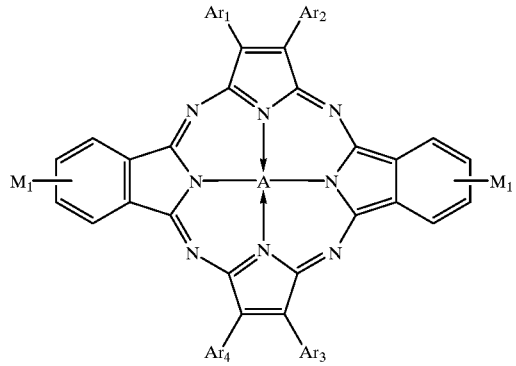

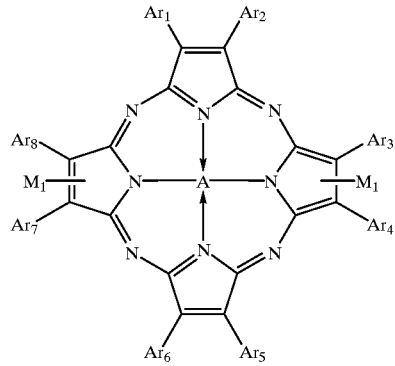

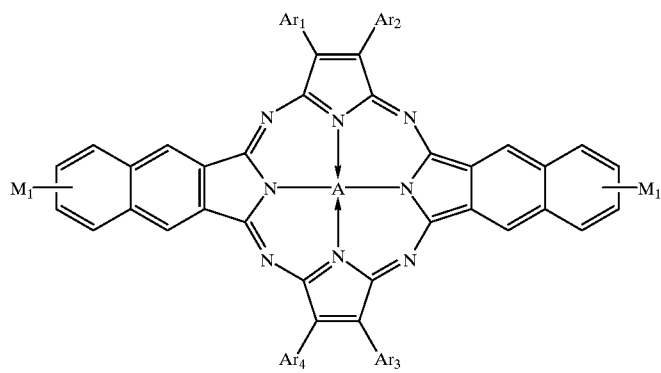

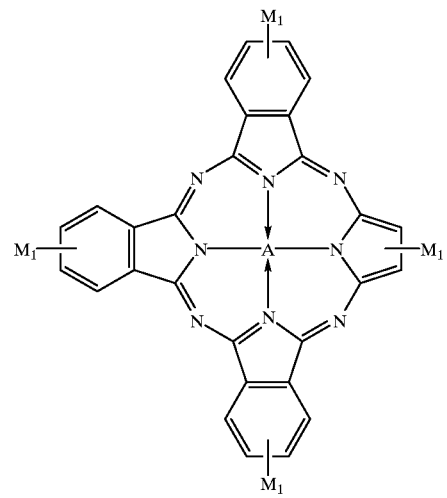

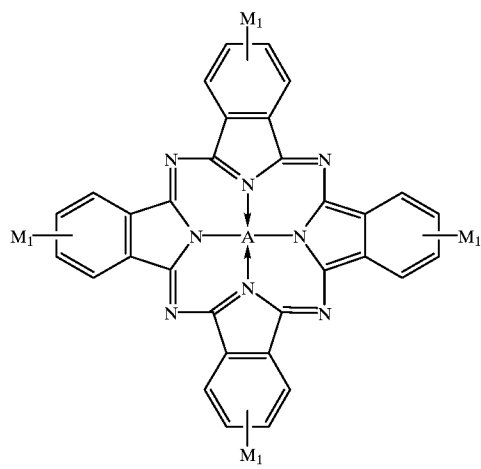

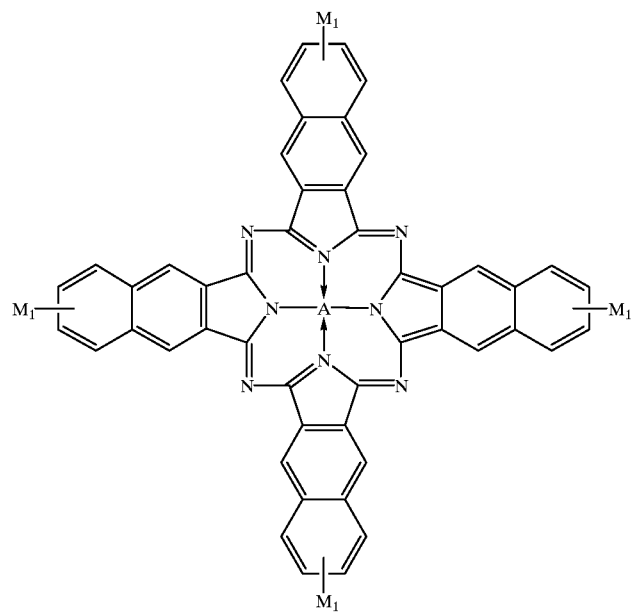

wherein each Ar, $Ar_1$–$Ar_8$ group is independently selected from fused aryl ring systems having one to four aryl rings fused therein and preferably from 1 to three rings. Preferably the Ar, $A_1{}^7$, $Ar_8{}^8$ groups are oriented symmetrically about the pyrrole nuclei. For example, if m is an even number the Ar, $Ar_1{}^7$–$Ar_8{}^8$ groups may be opposite from each other or alternating in structures where m is more than 3. If m is even the Ar, $Ar_1{}^7$–$Ar_8{}^8$ groups may be disposed in any configuration, which provides the desired degree of symmetry. Preferably the "symmetric" Ar, $Ar_1{}^7$–$Ar_8{}^8$ groups have the same number of fused aryl rings therein. Moreover, for greatest ease of synthesis, all Ar, $A_1^7$–$Ar_8^8$ groups in a NIRF are the same. Preferably, A in the above general structure represents Al and Si bonded to halogen or oxygen or sulfur or nitrogen. Other suitable NIRFs are disclosed in U.S. Pat. No. 5,397,819 and 5,416,136, which are incorporated herein by reference.

As described above, $M_1$ is or contains the polymer forming reactive group, which provides the NIRF with its copolymerizability or reactivity to the polymer backbone. Suitable reactive groups vary depending upon the backbone polymer, which is selected. Examples of such polymer forming groups include, but are not limited to:

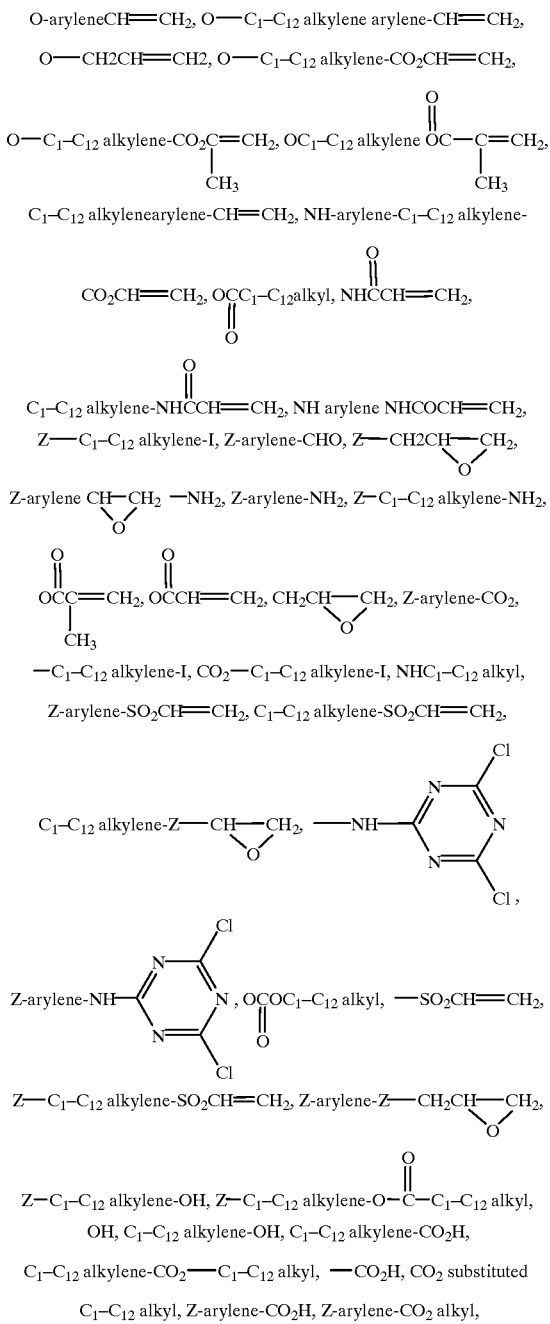

In the above list Z is selected from O, NH, N—$C_1$–$C_{12}$ alkyl, N-aryl, S, $SO_2$, Si or a direct bond.

When A contains the reactive group any of the above may be attached to the metal. For example:

AlOarylene-CH=$CH_2$, AlO$C_1$–$C_{12}$alkylene arylene-CH=$CH_2$, Al S arylene CH=$CH_2$, $C_1$–$C_{12}$ alkyleneCH=$CH_2$, Si[Oarylene CH=$CH_2$]$_2$ Al NH$C_1$–$C_{12}$ alkylene CH=$CH_2$, Si[O$C_1$–$C_{12}$ alkylene arylene CH=$CH_2$]$_2$, Si [NH$C_1$–$C_{12}$ alkylene arylene CH=$CH_2$]$_2$ and Si[O$C_1$–$C_{12}$ alkylene arylene CH=$CH_2$]$_2$.

In the above definitions the term "$C_1$–$C_{12}$ alkyl" is used to describe straight or branched chain monovalent hydrocarbon radicals containing 1–12 carbon atoms.

The term "substituted $C_1$–$C_{12}$ alkyl" is used to describe $C_1$–$C_2$ alkyl substituted with at least one group selected from $C_1$–$C_{12}$ alkoxy, halogen, trifluoromethyl, cyano, $C_3$–$C_8$ cycloalkyl, aryl, aryloxy, arylthio, arylsulfonyl, heteroaryl, NHCO$C_1$–$C_{12}$ alkyl, NHSO$_2$ $C_1$–$C_{12}$ alkyl, NHCO aryl, NH SO$_2$ aryl, NHCONH $C_1$–$C_{12}$ alkyl, NHCONH aryl, carbamoyl, sulfamoyl, $SO_2$F, CONH $C_1$–$C_{12}$ alkyl, —S heteroaryl, CONH aryl, $SO_2$ NH $C_1$–$C_{12}$ alkyl, $SO_2$ N($C_1$–$C_{12}$ alkyl)$_2$, $SO_2$ NH aryl, CONH $C_3$–$C_8$ cycloalkyl, $SO_2$ NH $C_3$–$C_8$ cycloalkyl, CON($C_1$–$C_{12}$ alkyl) aryl, $SO_2$N($C_1$–$C_{12}$ alkyl) aryl, CO$C_1$–$C_{12}$ alkyl, CO aryl, thiocyano, S $C_1$–$C_{12}$ alkyl, S aryl, $SO_2$ $C_1$–$C_{12}$ alkyl, $SO_2$ aryl and heteroaryl.

The term $C_1$–$C_{12}$ alkylene is used to describe straight or branched chain divalent saturated hydrocarbon radicals and these substituted with one or more groups selected from halogen, $C_1$–$C_{12}$ alkoxy, $C_3$–$C_8$ cycloalkyl and aryl.

The term "aryl" is used to describe phenyl and naphthyl radicals and these optionally substituted with halogen, $C_1$–$C_{12}$ alkoxy, $C_1$–$C_{12}$ alkyl, trifluoromethyl, cyano, $SO_2$ $C_1$–$C_{12}$ alkyl, thiocyano, hydroxy, O CO $C_1$–$C_{12}$ alkyl, CO$C_1$–$C_{12}$ alkyl, CO$_2$ $C_1$–$C_{12}$ alkyl, formyl, carbamoyl, sulfamoyl, $C_3$–$C_8$ cycloalkyl, NHSO$_2$ $C_1$–$C_{12}$ alkyl, CON ($C_1$–$C_{12}$ alkyl)$_2$, CONH $C_3$–$C_8$ cycloalkyl, $SO_2$NH$C_3$–$C_8$ cycloalkyl, $SO_2$NH phenyl, CO phenyl, CONH phenyl, NHCO $C_1$–$C_{12}$ alkyl, NHCO $C_3$–$C_8$ cycloalkyl, S heteroaryl, $SO_2$NH $C_1$–$C_{12}$ alkyl, CONH $C_1$–$C_{12}$ alkyl, $SO_2$N($C_1$–$C_{12}$ alkyl)$_2$, CON($C_1$–$C_{12}$ alkyl) phenyl, $SO_2$N ($C_1$–$C_{12}$ alkyl) phenyl, CON($C_1$–$C_{12}$ alkyl) phenyl, —$SO_2$N ($C_1$–$C_{12}$ alkyl) phenyl, $SO_2$ phenyl, S phenyl, O phenyl, NHSO$_2$ phenyl and NHCO phenyl, wherein each phenyl may contain one or more substituents selected from $C_1$–$C_{12}$ alkoxy, halogen and $C_1$–$C_{12}$ alkyl.

The term "heteroaryl" is used to represent mono or bicyclic heteroaromatic radicals containing at least one "hetero" atom selected from oxygen, sulfur and nitrogen or a combination of these. Examples of these suitable heteroaryl groups include: thiazolyl, benzothiazolyl, pyrazoyl, pyrrolyl, thienyl, furyl, thiadiazolyl, oxadiazolyl, benzoxazolyl, benzimidazolyl, pyridyl, pyrimidinyl, and triazolyl and these radicals substituted with one or more of the substituents mentioned above for the term "aryl".

The term "halogen" is used to include fluorine, chlorine, bromine and iodine.

The term "polymer forming reactive group" is used to describe a variety of reactive groups useful in making polymers and which are well-known in the art. A variety of these groups are disclosed by the examples of substituents $M_1$ described above.

Specific examples of suitable NIRFs and methods for their preparation are known in the art and described in U.S. Pat. Nos. 4,255,273; 5,292,855; 5,336,714; 5,397,819; 5,461,136; 5,525,516; 5,553,714 and 5,423,432, which are incorporated herein by reference.

The NIRF compounds may be admixed in the binder substrate as monomers or admixed or copolymerized into the thermoplastic resins, which are admixed into the binder substrate. Alternatively the NIRFs could be admixed or copolymerized into a second copolymer, which could be admixed in the binder substrate or copolymerized in the thermoplastic resin. Preferably, the NIRFs are admixed or compolymerized in the thermoplastic resins.

For copolymerized NIRFs the polymer backbone is any backbone, which is soluble, dispersible or emulsifiable in the binder substrate, or thermoplastic resins which are used as the main vehicle in the printing media. Suitable polymer backbones include polyesters, polyurethanes, polyolefins, polyamides, polysulfonamides, polyamines, polysiloxanes, polyacrylates, polyvinylacetates, polymethacrylates, polystyrenes, polysulfides and mixtures thereof. Specific polyester backbones include, but are not limited to polyester NIRF compositions prepared from sebacid acid or dodecanedioicacid, diethylene glycol or poly(ethylene) glycols and copolymerizable NIRF dyes as described in U.S. Pat. Nos. 5,397,819 and 5,461,136, which is incorporated herein by reference.

It will be appreciated by one skilled in the art that the reactive group $M_1$ is selected to be readily polymerizable to prepare a selected backbone structure via appropriate techniques of homopolymerization or copolymerization. Thus for polyester backbones, polyester reactive groups such as alkyl-OH, alkyl-$CO_2$-alkyl, alkyl-$CO_2$H, alkyl-$CO_2$-aryl, aryl-$CO_2$H, aryl-$CO_2$-alkyl, and the like would generally be selected. Copolymerization yields copolymerized NIRFs similar to the compounds described in U.S. Pat. Nos. 5,292,855; 5,336,714 and 5,423,432, which are each, incorporated herein by reference. These copolymerized polyester/thermally stable near infrared fluorophoric compounds include squaraine, phthalocyanine and naphthalocycanine type compounds, however other porphine type compounds as described above are also suitable.

Preparation of suitable backbone polymers is well known in the art and need not be described in detail here.

The copolymerizable compounds of the present invention, can be readily formulated into invisible thermally meltable inks which are suitable for thermal transfer.

Generally only small amounts of the NIRFs of the present invention are required to achieve the desired result. Amounts between about 10 ppm and 1000 ppm are sufficient.

The thermal transfer ribbon of the present invention is produced in a two stage process wherein the first stage includes preparation of a specific wax emulsion or formulation and the second stage includes preparation of the transfer coating or layer.

Generally, a wax adhesive emulsion uses hydrocarbons, paraffin or ozokerite, carnauba, microcrystalline waxes and an ethylene vinyl acetate copolymer and/or a hydrocarbon resin soluble in aliphatic solvents. The wax emulsion uses waxes plus the acetate copolymer plus the hydrocarbon resin in one formulation. In another formulation the wax emulsion uses waxes plus the acetate copolymer of the hydrocarbon resin.

Figure 6:
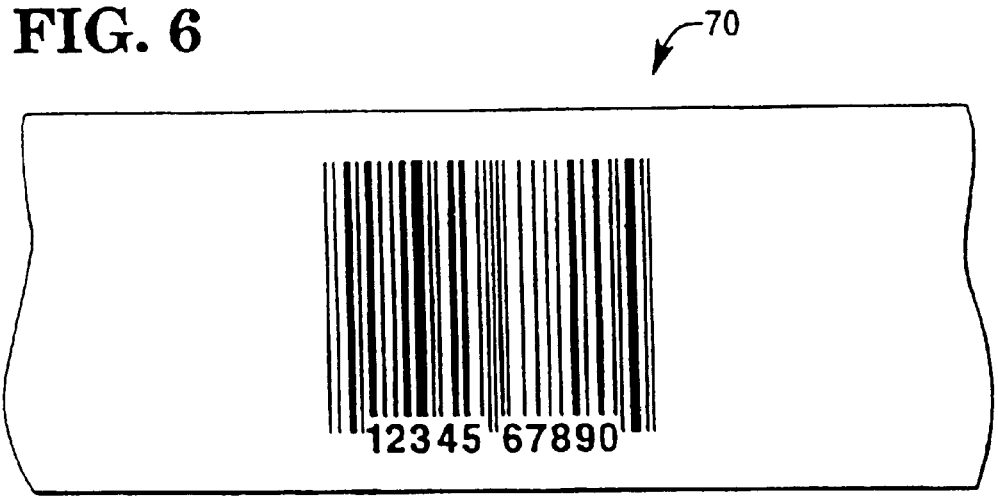
FIG. 6 is a top view of a thermally transferred bar code as printed on a print receiving medium using the ribbon shown in FIG. 1 or FIG. 3 or FIG. 4, as the bar code would visibly appear under broad spectrum light or black light.

One embodiment of the present invention comprises a dispersion of an acetate copolymer, at least one acrylic resin, carbon black and at least one invisible NIRF compound. Suitable examples of the components and their amounts are well known in the art. The resulting dispersion was coated at 20–25° C. onto the ribbon backing element 14 at a dry coat weight of 3±0.5 grams per square meter to form finished NIRF thermal transfer printing ribbon 10. When NIRF thermal transfer printing ribbon 10 was contacted with a sheet of paper or some other print receiving medium from the side of the printing media layer 12, using a thermal print machine or stamping tool to apply heat images to the ribbon 10 from the uncoated side of the ribbon backing element 14, a thermal transfer of the single printing media layer 12 to the paper or other print receiving medium occurred. This produced a positive transfer image on the paper or other print receiving medium which appears black when viewed under broad spectrum light or black light (UV-A to UV-B, about 280- about 400 nm). For example, if a bar code image was thermally printed using ribbon 10, the positive transfer image on white paper would appear as shown in FIG. 6 when viewed under broad spectrum light or black light. It also left a negative image on the ribbon 10. When the positive image was viewed with a near infrared camera designed for display of contrast images of the near infrared fluorescence on a video monitor, a very faint image could be discerned. At The weakness of the image is due to carbon black absorption of most of the activating laser light and near infrared fluorescence generated before it can exit the image surface. Use of black dye compositions, which do not absorb strongly in the near infrared in place of the carbon black pigment results in stronger contrast images.

Figure 2:
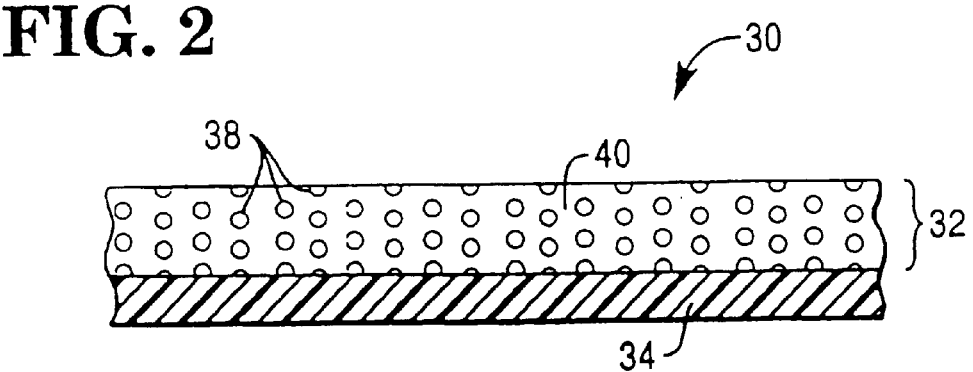
FIG. 2 is a cross-sectional side view of a thermal transfer ribbon comprising a single printing media layer containing at least one invisible NIRF marking compound.

Referring to FIG. 2, NIRF thermal transfer and printing ribbon 30 comprising a single printing media layer 32 which is adhered to one side of the ribbon backing element 34. Printing media layer 32 comprises a uniform dispersion of monomeric or polymeric NIRF dye compositions 38 in binding substrate 40 without any visible marking compounds. NIRF compositions are inactive under broad spectrum light and black light. Thus, images printed using ribbon 30 are transparent or invisible under broad spectrum light and black light, but the fluorescence generated when activated with appropriate near infrared light frequencies can be detected using a suitable detector or imaging device.

When ribbon 30 was contacted with a sheet of paper or some other print receiving medium from the side of the single printing media layer 32, using a thermal printing machine or stamping tool to apply heat images to the ribbon 30 from the side of the ribbon backing element 34, a transfer of the single printing media layer 32 to the paper or other print receiving medium occurred. This produced a positive transfer image on the paper or other print receiving medium which is invisible when viewed under broad spectrum light or black light. For example, if a bar code image were thermally printed using ribbon 30, the positive transfer image on white paper would be invisible when viewed under broad spectrum light or black light (see FIG. 6A). However, the transfer image could be detected or decoded with a near infrared fluorescence bar code scanner. Moreover, a strong image could be discerned as depicted on FIG. 6B when the transfer image was imaged with a near infrared fluorescence camera designed for display of contrast images of the near infrared fluorescence.

The thermal transfer also left a negative image of the bar code on the ribbon 30, which is invisible under broad spectrum light or black light, but can be examined with a near infrared fluorescence camera which permits display of a contrast image on a video monitor as depicted on FIG. 6.

In contrast to these results, a UV thermal transfer printing ribbon prepared as described in U.S. Pat. Nos. 5,516,590 (FIG. 2) was contacted with a sheet of paper from the side of the single printing media using a thermal printing machine or stamping tool to apply heat images to the ribbon from the side of the ribbon packing element to transfer the single printing media layer to paper. This produced a positive thermal transfer image on the paper, which is invisible when viewed under incandescent broad spectrum light but easily discerned by human vision under black light and conventional fluorescent lighting systems.

Another embodiment of the present invention comprises an emulsion of mineral spirits, copolymer resin, thermoplastic resin, wax and at least one invisible NIRF compound. Suitable examples of the components and their amounts are well known in the art.

The emulsion is coated onto ribbon backing element 34 at a dry coat weight of about 3 grams per square meter to form ribbon 30 which performed well when used to transfer images to paper as described above.

A fourth preferred formulation for the NIRF thermal transfer printing and marking ribbon of the present invention is given below:

| Ingredient | % Dry | % Dry Range | Grams Dry | Grams Wet |
| --- | --- | --- | --- | --- |
| Water | — | — | — | 70 |
| Aqueous Polymer Emulsion | 22 | 15–30 | 22 | 22 |
| Eastman Aqueous NIRF Polymer Emulsion (Example 2) | 8 | 5–15 | 8 | 8 |
|  | 30 | — | 30 | 100 |
| Water | — | — | — | 70 |
| Aqueous Polymer Emulsion | 22 | 15–30 | 22 | 22 |
| Eastman Aqueous NIRF Polymer Emulsion (Example 10) | 8 | 5–15 | 8 | 8 |
|  | 30 | — | 30 | 100 |

In the above preferred formulation of ribbon 30, the aqueous polymer emulsion is described in U.S. Pat. No. 5,552,231, Example 1, minus the carbon black pigment and the Eastman Aqueous NIRF Polymer emulsions are water dissipatible, sulfomonomer containing polyesters described in U.S. Pat. No. 5,614,008; the disclosures of which are incorporated herein by reference.

To fabricate a ribbon like 30 shown in FIG. 2 with the above formulation, the aqueous polymer emulsion is blended by rapid stirring at 20–25° C. with the Eastman aqueous NIRF polymer emulsion according to the recipes shown. The resulting emulsions were coated at 20–25° C. onto the ribbon backing element 34 at a dry coat weight of 3.1 + or − 0.5 grams per square meter to form ribbon 30 which performed well when used to transfer images to paper as described.

Figure 3:
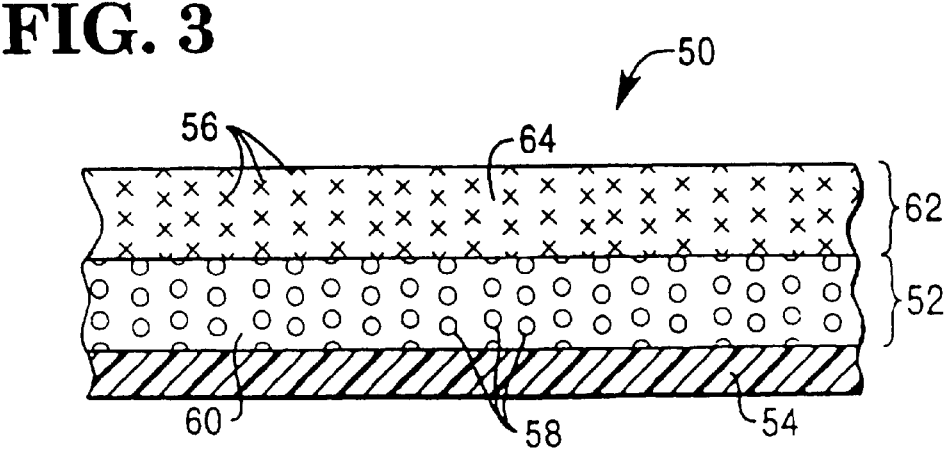
FIG. 3 is a cross-sectional side view of a thermal transfer printing ribbon having a first media layer containing at least one visible marking compound, and a second media layer containing at least one invisible NRF marking compound.

Referring now to FIG. 3, a third preferred embodiment of a NIRF thermal transfer printing and marking ribbon in accordance with the present invention, generally indicated by reference numeral 50, is shown. Ribbon 50 consists of a first printing media layer 52 which is adhered to one side of ribbon backing element 54, and second printing media layer 62 which is adhered to the top surface of first printing media layer 52. First printing media layer 52 preferably includes a uniform dispersion of a monomeric or polymeric NIRF dye composition in binding substrate 60. Second printing media layer 62 preferably includes a uniform dispersion of visible black or colored pigments 56 in binding substrate 64. Thus, images printed using ribbon 50 comprise a bottom layer of second printing media layer 62 with a uniform dispersion of black or colored pigments 56 in binding substrate 64 and a top layer of first printing media layer 52 with a uniform dispersion of monomeric or polymeric NIRF dye compositions 58 in binding substrate 60. Since the compositions 58 are transparent, and thus invisible under broad spectrum light and black light, visible black or colored pigments 56 allow the printed images to appear visibly black or colored, as desired, under broad spectrum light or black light. However, compositions 58 generate near infrared fluorescence when activated by appropriate near infrared light frequencies from lasers or LED (light emitting diode) sources, and this fluorescence can be detected using a suitable red or near infrared detector, scanner or camera.

Binding substrates 60 and 64 retain the dispersion of compositions 58 and 56 in their respective layers prior to the printing operation and once the layers are transferred onto the print receiving media. It is important that the two layers remain contiguous after the transfer so that the NIRF composition 58 in layer 52, are not mixed with the black or colored pigments 56 in layer 62 to minimize unwanted absorption of the infrared laser light by the black or colored pigments 56 in layer 62, which would reduce the efficiency of the detection by the NIRF camera (Example 2).

Figure 4:
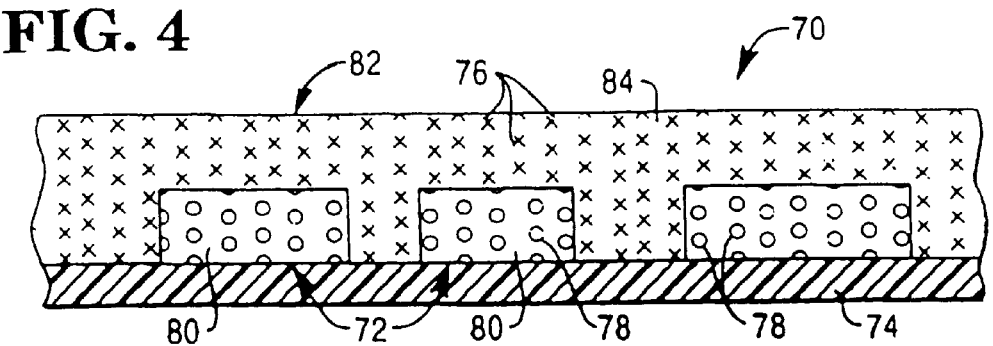
FIG. 4 is a cross-sectional side view of a thermal transfer printing ribbon having a first media layer containing at least one invisible NIRF marking compound which is applied to said ribbon in a predetermined configuration and a second media layer containing at least one visible marking compound.
Figure 5:
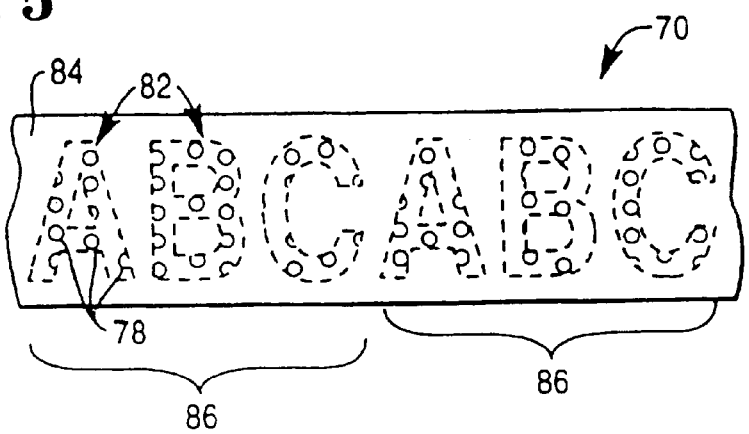
FIG. 5 is a top view of the thermal transfer printing ribbon shown in FIG. 4.

Referring now to FIGS. 4 and 5, a fourth preferred embodiment of a NIRF thermal transfer printing and marking ribbon in accordance with the present invention, generally indicated by reference numeral 70, is shown.

Ribbon 70 consists of first spot coated printing media layer 72 which is adhered to one side of ribbon backing element 74, and second printing media layer 82 which is adhered to the surface of first spot coated printing media layer 72 distal from backing element 74 and to portions of backing element 74 not covered by first spot coated printing media layer 72.

Figure 7:
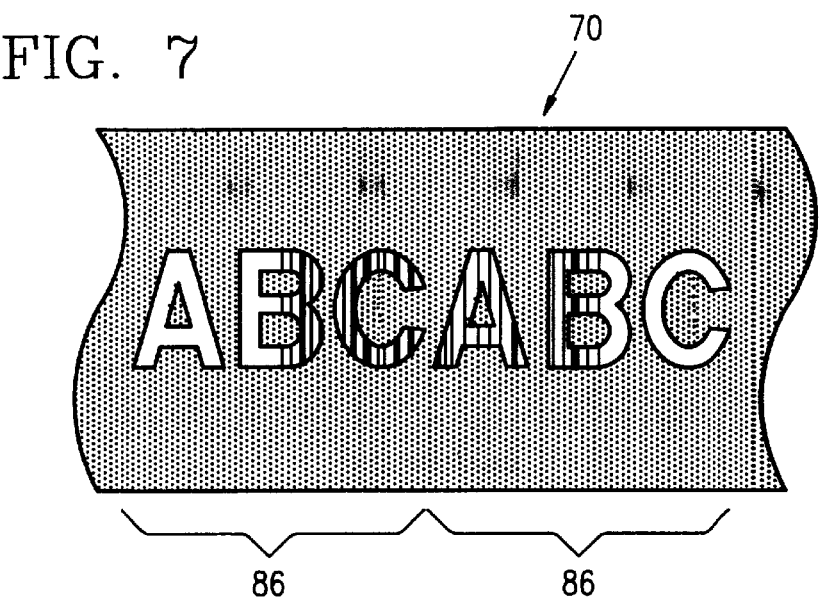
FIG. 7 is a top view of a thermally transferred bar code as printed on a print receiving medium using the ribbon shown in FIG. 4, as the bar code would appear when excited with an appropriate near infrared radiation source and imaged with a camera designed to display contrast images of the fluorescence.

First spot coated printing media layer 72 preferably includes a uniform dispersion of monomeric or polymeric NIRF dye composition 78 in binding substrate 80 spot coated in any desired pattern or configuration on ribbon backing element 74. For example, first spot coated printing media layer 72 could be spot coated in a pattern or configuration identifying a particular store's name, logo or some other desired identifiable configuration, as represented by repeating pattern 86 of ABC's shown in FIG. 5. Second printing media layer 82 preferably includes a uniform dispersion of visible black or colored pigments 76 in binding substrate 84. Images printed using ribbon 70 consist of a bottom layer of second printing media layer 82 with a uniform dispersion of visible black or colored pigments 76 in binding substrate 84 and a top layer of first spot coated printing media layer 72 with the spot coated pattern or configuration of uniform dispersion of NIRF dye composition 78 in binding substrate 80. Since composition 78 is transparent, and thus invisible under broad spectrum light, visible black or colored pigments 76 allow the printed images to appear visibly black or colored, as desired, under broad spectrum light or black light as shown in FIG. 6. NIRF dye composition 78 present in repeating pattern 86 generate near infrared fluorescence when activated by appropriate red or near infrared light frequencies from lasers or LED sources, and this fluorescence can be detected using an appropriate detector, scanner or imaging camera designed for display of contrast images of the fluorescence or a video monitor (see Example 2) for inspection as shown in FIG. 7.

Binding substrate 80 retains the spot coated uniform dispersion of NIRF dye composition 78 against backing element 74 prior to the printing operation. Similarly, binding substrate 84 retains the uniform dispersion of visible black or colored pigments 76 prior to the printing operation. In addition, binding substrate 80 retains the spot coated uniform dispersion of NIRF dye composition 78 and binding substrate 84 retains the uniform dispersion of visible black or colored pigments 76 after second printing media layer 82 and first spot coated printing media layer 72 are transferred onto paper or some other printing medium.

Figure 8:
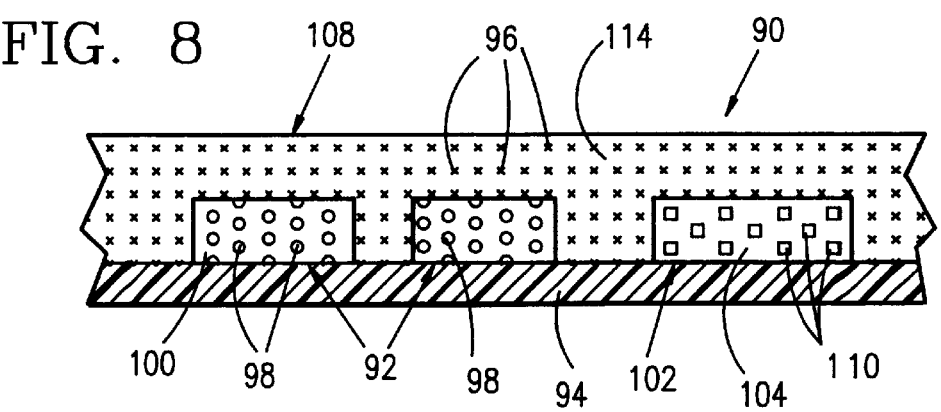
FIG. 8 is a cross-sectional side view of a thermal transfer ribbon having a first media layer containing at least one visible marking compound, a second media layer containing at least one invisible NIRF marking compound which is applied to said ribbon in a predetermined configuration and a third media layer containing at least one second invisible marking compound which is applied to said ribbon in a second predetermined configuration.
Figure 9:
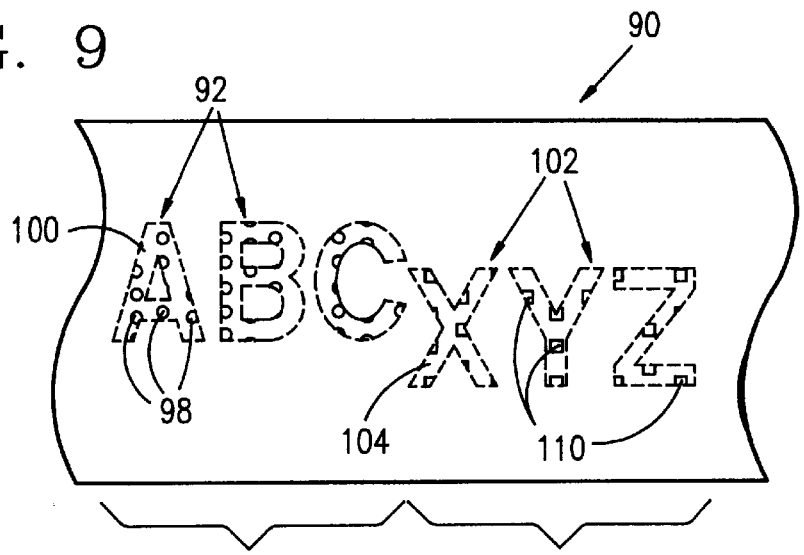
FIG. 9 is a top view of the ribbon shown in FIG. 8.

Referring now to FIGS. 8 and 9, a fifth preferred embodiment of a NIRF thermal transfer printing and marking ribbon in accordance with the present invention, generally indicated by reference numeral 90, is shown. Ribbon 90 consists of first spot coated printing media layer 92 which is adhered to one side of ribbon backing element 94, second spot coated printing media layer 102 which is adhered to the same side of ribbon backing element 94, and third printing media layer 108 which is adhered to the surfaces of first spot coated printing media layer 92 and second spot coated printing media 102 distal from backing element 94 and to portions of backing element 94 not covered by first spot coated printing media layer 92 and second spot coated printing media layer 102.

First spot coated printing media layer 92 preferably includes a uniform dispersion of monomeric or polymeric NIRF dye composition 98 in binding substrate 100 spot coated in any desired pattern or configuration on ribbon backing element 94. Similarly, second spot coated printing media layer 102 preferably includes a uniform dispersion of monomeric or polymeric NIRF dye composition 110 in binding substrate 104 spot coated in any desired pattern or configuration on ribbon backing element 94. For example, first spot coated printing media layer 92 could be spot coated in a first pattern or configuration represented by repeating pattern of ABC's shown in FIG. 9, identifying, for example, a particular product brand name, and second spot coated printing media layer 102 could be spot coated in a second pattern or configuration as represented by repeating pattern 112 of XYZ's shown in FIG. 9, identifying, for example, a particular product logo or trademark. If desired, second spot coated printing media layer 102 could be allowed to overlap first spot coated printing media layer 92 in a predetermined manner. Third printing media layer 108 preferably includes a uniform dispersion of visible black or colored pigments 96 in binding substrate 114.

Figure 10:
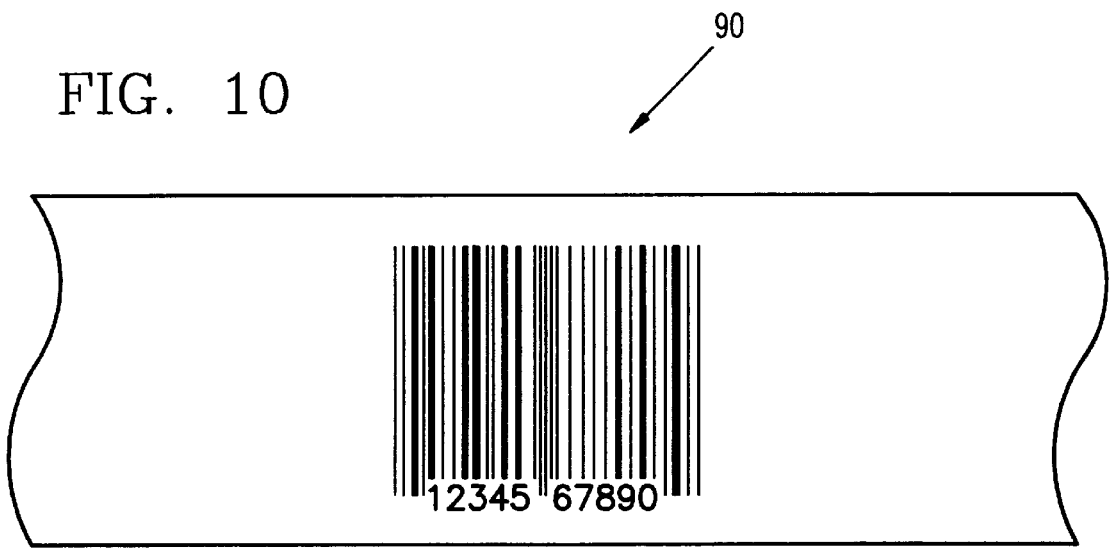
FIG. 10 is a top view of a bar code as printed on a print receiving medium using the ribbon of FIG. 8, as the bar code would appear under broad spectrum or black light.
Figure 11:
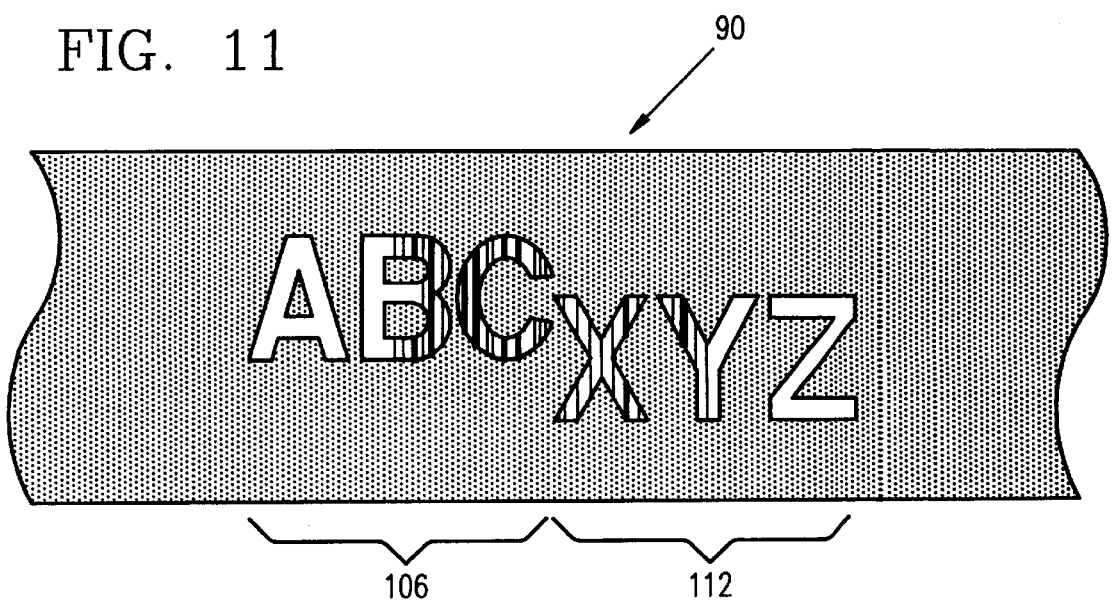
FIG. 11 is a top view of the bar code shown in FIG. 10 as it would appear when excited with an appropriate near infrared radiation source and imaged with a camera designed to display contrast images of the fluorescence.

Images printed using ribbon 90 consist of a bottom layer of third printing media layer 108 with a uniform dispersion of visible black or colored pigments 96 in binding substrate 114 and a top layer of first spot coated printing media layer 92 with the spot coated pattern or configuration of uniform dispersion of monomeric or polymeric NIRF dye composition 98 in binding substrate 100 and second spot coated printing media layer 102 with the spot coated pattern or configurations of uniform dispersion of monomeric or polymeric NIRF dye composition 110 in binding substrate 104. Since 98 and 110 are transparent, and thus invisible under broad spectrum light and black light, visible black or colored pigments 96 allow the printed images to appear visibly black or colored, as desired, under broad spectrum light as shown in FIG. 10. Monomeric or polymeric NIRF dye composition 98 present in repeating pattern 106 and monomeric or polymeric NIRF dye composition 110 present in repeating pattern 112 generate near infrared fluorescence when activated by appropriate near infrared light frequencies from lasers or LED sources, and this fluorescence can be detected by a suitable detector, scanner or imaging camera. The unique pattern created by the fluorescence and imaged by a near infrared fluorescence camera is shown in FIG. 11 for the case of monomeric or polymeric NIRF dye compositions 98 and 110 being identical. If 98 and 110 are selected to be non-identical, then either 98 or 110 can be detected using the camera configuration described in Example 2 and either repeating pattern 106 or 112 will be stored in the digital camera memory and can be observed on the video monitor.

If the camera filters are reconfigured to permit detection of fluorescence generated by excitation of the printed repeating pattern 106 or 112 in FIG. 9 which previously was not recorded, by excitation with appropriate near infrared light from a laser correct for NIRF dye composition 98 or 110, then the other repeating pattern 106 or 112 will be selectively stored in the digital camera memory and can be observed on the monitor. Thus, by correct selection of laser excitation sources and filters on the camera described in Example 2, it is possible to visualize the image of either repeating pattern 106 or repeating pattern 112. If desired, both images so recorded can be displayed simultaneously as shown in FIG. 11, with the luminosity of the image from repeating pattern 106 slightly different from repeating pattern 112, due to differences in the overall efficiencies of the two NIRF detection processes. Selective detection of images from repeating pattern 106 or from repeating pattern 112 is an additional security feature made possible by using ribbon 90 of the present invention, which is not possible using near ultraviolet fluorescent pigments exposed to black light, instead of near infrared fluorescent dye compositions described herein.

Binding substrates 100 and 104 retain the spot coated uniform dispersions of monomeric or polymeric NIRF dye composition 98 and 110 in their layers prior to the printing operation and after the printing media is transferred to the print receiving media.

The print media layer of the present invention may also include additional components to achieve certain desired results. Such additional components may include, but are not limited to molecular weight modifiers, charge modifiers, plasticizers and cross linking agents.

The NIRF thermal transfer printing and marking ribbon of the present invention is superior to the ultraviolet fluorescent thermal transfer printing and marking ribbon previously disclosed in the prior art. UV fluorescent images or marks are easily activated, and visualized by human vision under black light, and even under many conventional room lighting conditions such as fluorescent bulbs. This makes it easy to locate such images or marks under a black light. The images and marks of the present invention are not easily identified by human vision under black light, broad spectrum light, or infrared light. Hence the present invention provides a superior feature in security marking of ID documents and items of commerce to prevent fraudulent use, counterfeit, substitution, and diversion of consumer or industrial products.

The images and marks of the present invention have superior light, thermal, and chemical stability and are more resistant to fluorescence quenching mechanisms commonly encountered in formulation of thermal transfer ribbons. Moreover, the NIRF dyes can be used at lower concentrations due to greater overall absorbance and fluorescence quantum efficiencies.

Printing of ultraviolet fluorescence bar codes on paper and other print receiving media containing interference ultraviolet absorbing or fluorescing compositions (deriving from original manufacture, recycling manufacture, or contamination during manufacture or prior to printing) creates serious problems in successful bar code scanning and decoding. NIRF bar code printing and scanning systems are free from interferences deriving from background near infrared fluorescence or absorption because such materials are very rarely encountered in paper or other print receiving materials, as well as in the commercial world, in general.

Images or marks made from the thermal transfer compositions of the present invention may be detected or imaged in a number of ways. For example, the images could be detected by a simple "yes/no" detector, which detects the presence, but not the configuration of the mark or image. Alternatively the images or marks may be detected using a scanner which can detect and distinguish unique images such as barcodes or a near infrared fluorescence camera designed for display of contrast images of the fluorescence on a video monitor.

Methods for printing marks or images comprising at least one invisible NIRF compound are also disclosed. A suitable method comprises the steps of providing a thermal transfer ribbon comprising a ribbon backing element and at least one printing media layer comprising at least one invisible NRF compound; and contacting said ribbon backing element with a heating element so as to contact said printing media layer with a print receiving media under conditions sufficient to thermally transfer an image thereto.

Also disclosed in the present invention is a method comprising the steps of exciting a thermal transfer image containing at least one invisible NIRF compound with radiation having a wavelength between about 630 nm and 1100 nm; and detecting fluorescence emitted from said invisible NIRF compound.

Suitable NIRF cameras are designed to detect and display contrast images of the fluorescence on a video monitor for human visualization and/or inspection, as shown in FIG. 7. An example of suitable instrumentation for higher power laser scanning for a digital camera is described as follows: The excitation source is a 780 nm (50 mW) laser diode such as those available from Lasermax Inc., Rochester, N.Y. coupled with a scanning system. The scanner system comprises a real-time galvanometer-based point scanning system with near uniform illumination. Scanning head and the control boards (General Scanning Inc., Watertown, Mass.) are powered by a triple DC power supply (VIZ model WP 708A, General Scanning Inc., Watertown, Mass.). The x-y scan head comprises of a 8 kHz counter-rotating scanner and a moving magnet galvanometer. The galvanometer provided the vertical scan and the counter-rotating scanner provided the horizontal scan. Three control boards were supplied with the scan head: the pixel clock, counter-rotating scanner driver and a moving magnet galvanometer servo-controller. The sinusoidal motion of the counter-rotating scanner was corrected by phase locking the pixel clock to the scanner and by adjusting the clock rate to match the sinusoidal velocity. The scanning system had a frame rate of up to 100 frames per second.

The detection system comprised a CCD camera (model HPC-2 large area CCD Imaging System, Spectra source Instruments, California), thermoelectrically cooled by a cooling unit and controlled by an IBM PC with an interface card. A 55 mm Nikon lens with a 2.4 f stop was used for collecting the emitted light. To achieve effective cutoff of the scattered light from excitation source and stray light, two emission bandpass filters (2", rejection ratio of $10^5$) with a cutoff of 820±20 nm and 820±10 nm were used.

Data acquisition and analysis were performed by Windows-based software supplied by Spectra source. The software also provided a script language programming to automate data acquisition and to control external devices within the application program. The software had provisions for dark field and flat field corrections. A 90 MHZ Pentium computer with 32 MB RAM was used to gather data and control the CCD camera.

Although the present invention has been described above in detail, the same is by way of illustration and example only and is not to be taken as a limitation on the present invention. For example, although the use of two spot coated printing media layers has been described herein, the use of three, or even more, such spot coated layers could be readily accomplished utilizing the teachings of the present invention. It is also possible to use the present invention for thermal transfer printing of encoded information such as security characters, text, bar codes, and other indicia or images on transparent tape or laminating ribbons for attachment to or lamination with a wide variety of security documents; ID, permit, credit and debit cards; etc. The information can be encrypted, encoded, and printed on the tape or lamination medium, is not visible to the human eye, but can be decoded with NIRF cameras described herein, decrypted, and displayed as images on video monitors for comparison to control or standard images for information authentication as described in U.S. Pat. No. 5,514,860.

Although the bar code illustrated was one dimensional, printing of two dimensional bar codes is possible and even more useful in many applications of the present invention. Therefore, the scope and content of the present invention are to be defined only by the terms of the appended claims.

EXAMPLES

Example No. 1

Components I–IV were added to a 500 mL round bottom flask, which was fitted with a vacuum outlet, stirrer, condensate take off and nitrogen inlet:

I. 78.44 (0.39 mole) sebacic acid

II. 117.68 g (0.59 mole) poly(ethylene glycol) (Mn200)

III. 75 ppm Ti catalyst as Titanium (IV) butoxide

IV. 0.14 g (1.25×10–4 mole) infrared fluorescent compound $[(C_6H_5O)_4 \; PcAlOC_6H_3-3,5-di-CO_2CH_3]$ Pc=phthalocycanine nucleus–compound of Example 4 of U.S. Pat. No. 5,336,714

The flask and contents were immersed in a Belmont metal bath at 200° C. with a nitrogen sweep over the reaction mixture and held for 1.0 hr. The temperature was increased to 220° C., held for 2.0 hours, and then increased to 270° C. over about 10 minutes. Vacuum was then applied to lower the pressure to about 0.1 torr over about 30 minutes and the polycondensation reaction completed by heating at about 270° C. for 30 minutes. The resulting polymer which contains about 1000 ppm of copolymerized near infrared fluorophore has an inherent viscosity of 0.49 as measured in a 60/40 ratio by weight of phenol/tetrachloroethane at a concentration of 0.5 g per 100 mL. By gel permeation chromatography, the polymer, which was a very viscous liquid, has a weight average molecular weight (Mw) of 21,190, a number average molecular weight (Mn) of 8182, and a polydispersity (Mw÷Mn) value of 2.68. The procedure was repeated using 0.28 g dye and 0.42 g dye to give analogous polymers having 2000 ppm and 3000 ppm copolymerized NIRF dye and respective IVs (Mw; Mn; Mw÷Mn) as follows: 0.48 (21,000; 8050; 2.61) and 0.49 (21,300; 8250; 2.58).

Example No. 2

A coating composition consisting of a mixture of 5 g UCAR Latex emulsion 379 (Union Carbide) and 5 g Eastman aqueous NIRF polymer emulsion described in U.S. Application Docket No. 70278, Example 9 except using 0.2 g NIRF compound of Example 29 of U.S. Pat. No. 5,397,819 instead of 0.4 g was coated on white paper to give a thin uniform film approximately 1–2 mils thick after drying. The dry coating had about 10 ppm of NIRF dye polymer. The coating was marked with crossing line patterns using a black ink pen to give a contrast image (Test Paper 1). Using the thermal transfer printing ribbon of the present invention it is possible to transfer bar code patterns to white paper which are invisible (Test Paper 2). The Test Paper 1 was excited in a dark room with a 670 min. one milliwatt laser source by manual and rapid continuous scanning of the laser beam over the crossing line patterns. The scanning was continued while a modified Kodak digital camera system was permitted to record any light received from the target pattern during a preselected exposure time. The digital camera system (DCS) used a Nikon F-3 camera body with standard 35 mm SLR accessories (5.8 inches wide×5.8 inches high× 3.8 inches deep-weight about 3.5 pounds less lens system). The DCS had a E-O back with a high resolution charge couple device (CCD) 1280×1024 pixel array (16 micron square pixels, equivalent ASA of up to 1600, 2.5 images per second in a burst, using Nikon F-3 lens and accessories). The camera was mounted on a vertical holding device which permitted positioning a static object horizontally underneath the camera lens to permit focusing. The light (i.e. electronic signal) recorded by exposure of Test Papers at a distance of about 10 inches from the camera lens was stored in a digital storage unit designed to receive the electronic signals generated by the E-O (electro-optical) CCD sensor which converts photon or light energy to an electronic signal. The DCS digital storage unit was 4 (four) inches high×10.25 inches wide×13.25 inches deep (weight about 11 pounds including battery pack for remote operation). The specifications are: with rechargeable battery pack (standard camcorder type), 12 MHZ 80C188 processor, 8 MB image DRAM (32 M Byte optional), 200 M Byte Winchester hard disk (store up to 156 images). Optional JPEG compression (stores up to 600 images), user selectable equivalent ISO of 200, 400, 800, or 1600 (with B&W unit), 12 button membrane keyboard, SCSI parallel interface, optional RS-232 serial interface, NTSC video interface (RS-170) for external video monitor or processing, 2 line×16 character backlit LCD alphanumeric display, preview images on built in 4 inch LCD display. The Kodak megapixel array M-3 was used in the camera. The 35 mm lens was removed and a 710 nm band pass filter was mounted on top of the 35 mm lens (between the lens and CCD to ensure that only fluorescence light photons reach the CCD) and the modified lens re-installed.

Figure 12:
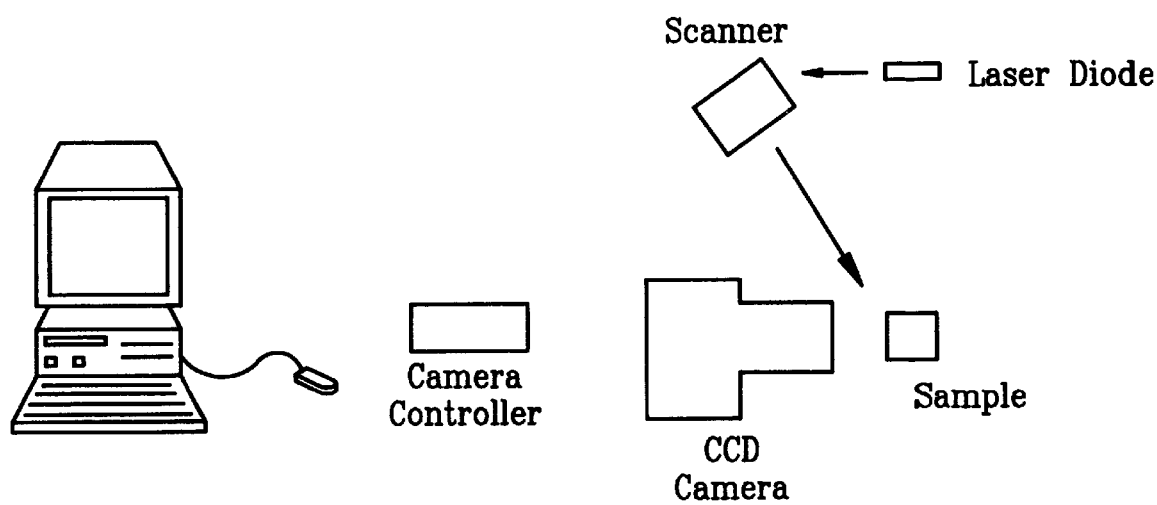
FIG. 12 is a diagram of the components of an apparatus suitable for scanning and imaging the near infrared fluorescent marks of the present invention.

In total darkness, a four second exposure of a control coating containing no NIRF polymer was made using 670 mm laser scanning activation (as described above) provided by a 670 nm 1 milliwatt laser pen modified with a 670 nm. band pass filter which reduced the power approximately 50% to about 0.5 milliwatt. No image was recorded or displayed on the 4 inch LCD preview display and only a black screen was displayed on the external still record to a XL-7700 thermographic printer on Kodak electronic print paper. The image 2339 control (4 second with 710 filter) was black. When the experiment was repeated by manual scanning 4 seconds the crossing line patterns drawn on top of the fluorophore containing coating (Test Paper 1), image 2336 was detected in total darkness and a bright contrast image was recorded. It was obvious that where the manual scanning dwell time was longest, the white signal was strongest. A similar result was obtained with coatings containing 20 ppm and 1.8 ppm NIRF polymer using ½ second exposure, (Images 2268 and 2293). It was obvious from the signal intensities that much lower concentrations would be feasible (parts per billion and possibly parts per trillion). Images of large diameter circle patterns and checker-board patterns were recorded and printed (Images 2341 and 2334). Coatings prepared using a NIRF polymer requiring 780 nm. activation produced no images using the 670 nm. laser activation thereby demonstrating the selectivity possible with this imaging technique. The test coatings prepared using the 1.8 ppm 670 NIRF polymer and the 10 ppm 780 NIR polymer were invisible when viewed under broad spectrum light or black light. Since the electronic image information recorded can be stored, amplified, computer enhanced, decrypted if necessary with appropriate software for required mathematical algorithms of encryption, and transmitted at the speed of light over large distances, this imaging system is suitable for many identification, authentication, surveillance, tracing, and marking applications. Test Paper 2 when imaged with a digital imaging camera produces sharp well defined positive bar code images which, if encrypted as a 2 D bar code, can be decoded using appropriate computer software to display the decrypted printed information on the video monitor or print it on a XL-7700 thermographic printer using Kodak electronic print paper. The feasibility of identification over larger distances using a higher power laser scanning activation system and the digital camera further modified with more powerful near infrared light accumulating lens accessories was demonstrated using NIRF polymer coatings on small 2 D and 3 D targets placed at distances from a few feet to 100 feet. An example of suitable instrumentation for higher power laser scanning for a digital camera is described as follows and shown in FIG. 12:

The excitation source is a 780 nm (50 mW) laser diode such as those available from Rochester, N.Y. coupled with a scanning system. The scanner system comprises a real-time galvanometer-based point scanning system with near uniform illumination. Scanning head and the control boards (General Scanning Inc., Watertown, Mass.) are powered by a triple DC power supply (VIZ model WP 708A, General Scanning Inc., Watertown, Mass.). The x-y scan head comprises a 8 kHz counter-rotating scanner and a moving magnet galvanometer. The galvanometer provided the vertical scan and the counter-rotating scanner provided the horizontal scan. Three control boards were supplied with the scan head: the pixel clock, counter-rotating scanner driver and a moving magnet galvanometer servo-controller. The sinusoidal motion of the counter-rotating scanner was corrected by phase locking the pixel clock to the scanner and by adjusting the clock rate to match the sinusoidal velocity. The scanning system had a frame rate of up to 100 frames per second.

The detection system comprised a CCD camera (model HPC-2 large area CCD Imaging System, Spectra source Instruments, California), thermoelectrically cooled by a cooling unit and controlled by an IBM PC with an interface card. A 55 mm Nikon lens with a 2.4 f stop was used for collecting the emitted light. To achieve effective cutoff of the scattered light from excitation source and stray light, two emission bandpass filters (2", rejection ratio of $10^5$) with a cutoff of 820±20 nm and 820±10 nm were used.

Data acquisition and analysis were performed by Windows-based software supplied by Spectra source. The software also provided a script language programming to automate data acquisition and to control external devices within the application program. The software had provisions for dark field and flat field corrections. A 90 MHZ Pentium computer with 32 MB RAM was used to gather data and control the CCD camera.

Less sensitive and expensive CCD imaging detectors were designed and constructed to permit continuous observation on a video monitor of the near infrared fluorescence produced by activation of invisible bar codes or other information printed using the NIRF thermal transfer printing and marking ribbons of the present invention. In these devices, appropriately selected cut on filters were chosen to detect (pass) the fluorescence light and reject the laser excitation light received from test samples examined at a pre-set distance alternatively side by side versus standard or control samples in a small black viewing box (about 3 inch×6 inch×12 inch) designed to eliminate background light interference from any source. This device permits authentication of the printed invisible markings or visualization of other printed information.

In one embodiment of an inexpensive portable fluorescence imaging device, a Marshall Electronics (Culver City, Calif.) Model V-1055 CCD camera (12 V DC 100 mA, 0.005 lux 510–492 pixels, 3 ounces, 1½"×1½"×1" with a Marshall Electronics V-4508,8 mm,f 1.3 lens was mounted inside the top surface of a 12" tall, 6" long and 3" wide plastic box, which was open at the bottom. On one side of the camera a 3 mW, approximately 675 nm diode laser (Power Technology Inc., Little Rock Ark., Model PM03(670-5)) was mounted. The laser's lens was defocused to produce an illuminated area of approximately 1"×3" at the open bottom of the box. On the other side of the camera an approximately 10 mW, 780 m Laser diode was mounted. This laser's lens was also defocused to illuminate an area of about 1"×3" at the bottom of the box. The camera and lasers were connected to a battery pack holding eight AA batteries. All eight batteries in series were used to power the 780 nm laser and the camera. Only three of the batteries were needed for the 675 nm laser. By connecting one or the other of the lasers to the battery pack, the fluorescence from items marked with fluorophores requiring excitation near 780 nm or near 675 nm could be induced when the imaging device was placed onto such items. To image the fluorescence from the marked items, an appropriate filter was placed in front of the cameras lens using a plastic holder. When using the 675 nm laser, bandpass filters centered at either 720 nm or 730 nm (Corion Holliston, Mass., models S10-720-F or S10-730-F, bandpass of 12 nm FWHM) or long-pass cut-on filters with a cut-on wavelength of 715 nm or 725 nm (Oriel Instruments, Stratford, Conn., Catalog #51345 or 51315) were used. The cut-on filters are best used in pairs of two stacked back-to-back. For use with the 780 nm laser, band pass filters centered at 820 nm, 830 nm or 840 nm (Corion, 510-820-F, S10-830-F or S10-840-F) or Schott Glass equivalent RG-830 or RG 850 Long pass, cut-on filters (Oriel Instruments, Catalog #51352 or 51360, also used in pairs) are placed in front of the camera. The images can be viewed on a handheld 2.7" diagonal video monitor (Sony FM 030 watch CAM) that is connected to the camera. Alternatively for better image quality, the camera could be connected to any standard television monitor. In an even more compact imaging device, the model V-1055 CCD camera (Marshall Electronics) with a V-4508 lens was mounted inside a plastic housing 7.5" tall×3" wide×4" long. The camera was mounted in such a way as to place the front of the lens 3¼" above an 2¼"×1¾" opening. Four 5 mW, 780 nm Laser diodes without collimating lenses were placed 2" from the opening and spaced so as to relatively evenly illuminate any object placed under the opening in the box. Each laser diode was powered by a laser diode driver. A 3" diagonal active matrix color LCD monitor (Sony Model XV-M30) was mounted on a swivel to the top of the plastic housing. All power was supplied by a 12 V lead-acid camcorder battery. Two RG-850 long-pass optical filters were used in front of the camera lens to reject the laser light, but pass the fluorescent light.

Example No. 3

Components I–IV were added to a 500 mL round bottom flask, which was fitted with a Dean-Stark trap and a reflux condenser:

I. Yellow Carnauba T1 Wax (62 g.) or Rice Bran Wax (71 g.)

II. Stearyl alcohol (2.1 g.)

III. 75 ppm Ti catalyst as titanium (IV) butoxide

IV. 0.02 g NIRF dye $(C_6H_5O)_4$ $PcAlOC_6H_3$-3,5-di-$CO_2CH_3$— compound of Example 4 of U.S. Pat. No. 5,336,714.

The mixture was heated 18 min. at 202° C. and then at 164° C. with stirring for 2 hours; during this time the dye gradually was converted to the stearyl ester derivative and methanol distilled into the Dean Stark trap (plus trace quantities of nBuOH). As the reaction progressed the dye dispersed well into the wax solvent. At the end of the reaction judged complete by TLC and FDMS analysis of a sample of the reaction mixture) the product was used directly in preparing NIRF thermal transfer printing and marking ribbon 30 shown in FIG. 2 as described above.

Example No. 4

The procedure of Example No. 3 was repeated using 0.02 g NIRF dye (tert-butyl)4 $NcAlOC6H3$-3,5-di-$CO2CH3$ in place of component IV. At the end of the reaction the product (tert-butyl)$_4$ NcAl $OC_6H_3$-3,5-di-$CO_2C_{18}H_{37-n}$, dispersion in Carnauba wax or Rice Bran Wax and stearyl alcohol was used directly is preparing thermal transfer printing and marking ribbon type 30 shown in FIG. 2 as described above.

Example No. 5

The procedure of Example No. 3 was repeated using 0.02 g NIRF dye (tert-Butyl)$_4$ NcSi $(OC_6H_3$-4-$CO_2CH_3)_2$ in place of component IV. At the end of the reaction the product (tert Butyl)$_4$ NcSi$(OC_6H_3$-4-$CO_2C_{18}H_{37-n})_2$ dispersion in Carnauba wax or Rice Bran Wax and stearyl alcohol was used directly in preparing thermal transfer printing and marking ribbon type 30 shown in FIG. 2 as described above.

Example No. 6

The procedure of Example No. 3 was repeated using 0.02 g NIRF dye $(C_6H_5S)_4$ $PcAlOC_6H_3$-3,5-di-$CO_2CH_3$ in place of component IV. At the end of the reaction the product $(C_6H_5S)_4$ $PcAlOC_6H_3$-3,5-di-$CO_2C_{18}H_{37-n}$ dispersion in Carnauba wax or Rice Bran Wax and stearyl alcohol was used directly in preparing thermal transfer printing and marking ribbon type 30 shown in FIG. 2 as described above.

Example No. 7

The procedure of Example No. 3 was repeated using 0.02 g NIRF dye shown below for which R=$CH_2CH_2CH_2CH_2CH_3$ in place of component IV and 4 g of stearyl alcohol. At the end of the reaction the product R=$(CH_2)_{17}CH_3$ dispersion in Carnauba wax or Rice Bran Wax and stearyl alcohol was used directly in preparing thermal transfer printing and marking ribbon type 30 shown in FIG. 2 as described above.

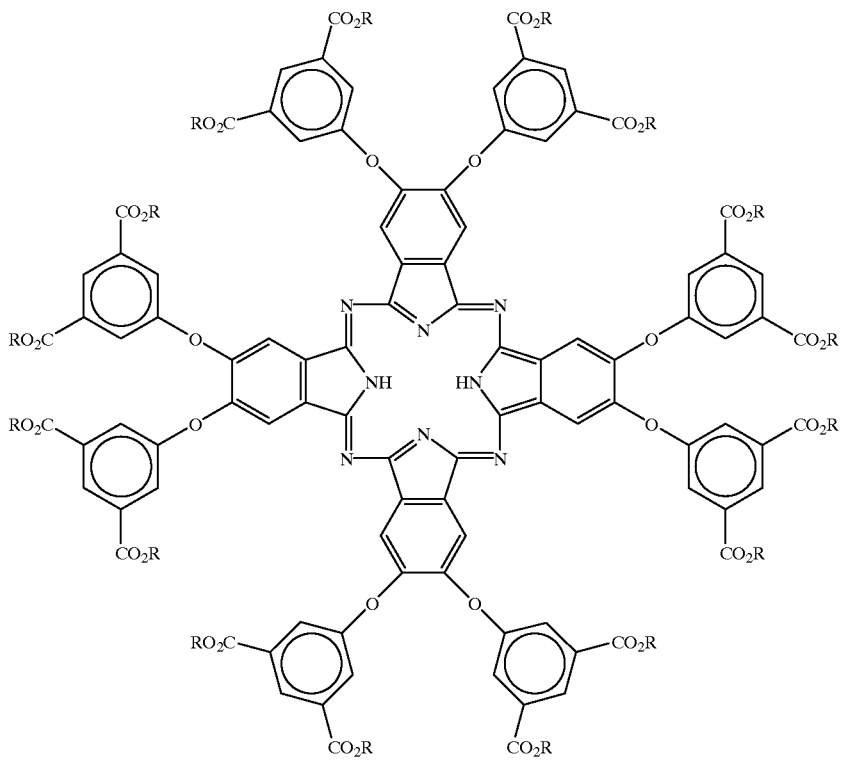

Example No. 8

5 g of the mineral spirits formulation given for ribbon 30 shown in FIG. 2 described above is mixed with 2 g. of a solution of 30 mg. of tetra-phenyl-naphthalocyanine aluminum hydroxide dissolved in 100 g. methylene chloride solution. The mixture is stirred well and then coated on the ribbon backing element 34 shown in FIG. 2. The ribbon 30 so prepared is used to print invisible images of a dinosaur on white paper by using a hot rubber stamp on the back side of ribbon 34 (temperature of the stamp at 120–160° C., mild hand applied pressure for 5 seconds at each temperature). When the ribbon 30 so used was peeled off the white paper, a positive dinosaur image could be viewed on a video monitor when the invisible positive image on the paper was detected with the near infrared fluorescence cameras described in Example 2 above, or when the negative image on ribbon 30 was detected with these cameras.

Example No. 9

Example 8 is repeated with the same image results using 5 g of a solution prepared from 5 g polymer X-25251-137 containing 2000 ppm aluminum phthalocyanine chloride and 1.064 g tetra-butyl ammonium bromide dissolved in 130 g methylene chloride. This solution required 2 days to prepare and contained a fine precipitate of sodium bromide which was very difficult to filter and therefore not removed.

Polymer X-25251-137 was prepared as follows by adding components I–VII to a 500 mL round bottom flask which was fitted with a vacuum outlet, stirrer, condensate take off and nitrogen inlet:

I. 81.74 g dimethyl isophthalate
II. 27.35 g 5-sodiosulfo-1,3-isophthalic acid
III. 44.15 g diethylene glycol
IV. 34.07 g 1,4-cyclohexane dimethanol
V. 0.74 g sodium acetate
VI. 0.28 g chloroaluminum phthalocyanine
VII. 75 ppm Ti catalyst as Titanium (IV)butoxide The flask and contents were immersed in a Belmont metal bath at 200° C. with a nitrogen sweep over the reaction mixture and stirred well for 1.0 hour. The temperature was increased to 220° C., held for 2.0 hours, and then increased to 250° C. over about ten minutes; vacuum was then applied to lower the pressure to about 0.1 torr about 36 minutes and the polycondensation reaction completed by heating at about 250° C. for 25 minutes. The polymer produced which contains copolymerized near infrared fluorophore has an inherent viscosity of 0.337 as measured in a 60/40 ratio by weight of phenol/tetrachloroethane at a concentration of 0.5 g per 100 mL. The glass transition temperature (Tg) was 51° C.

We claim:

1. A thermal transfer ribbon comprising a ribbon backing element and at least one printing media coated on the backing element layer comprising at least one near infrared fluorescent compound in a concentration which provides detectable fluorescence without imparting color to a mark made from said printing media layer, said near infrared fluorescent compound is selected from the group consisting of phthalocyanine of the formula:

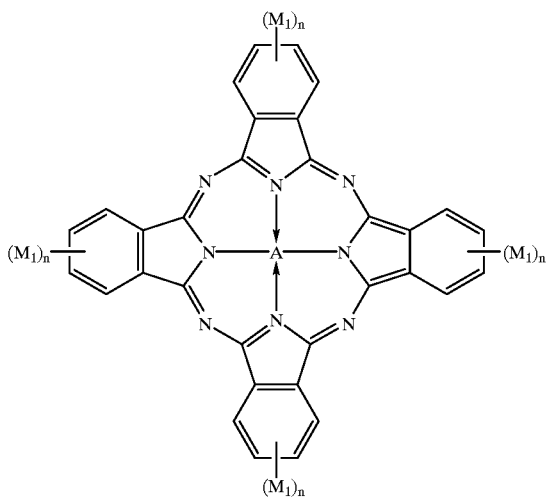

wherein n is 1 or 2 and naphthalocyanine of the formula:

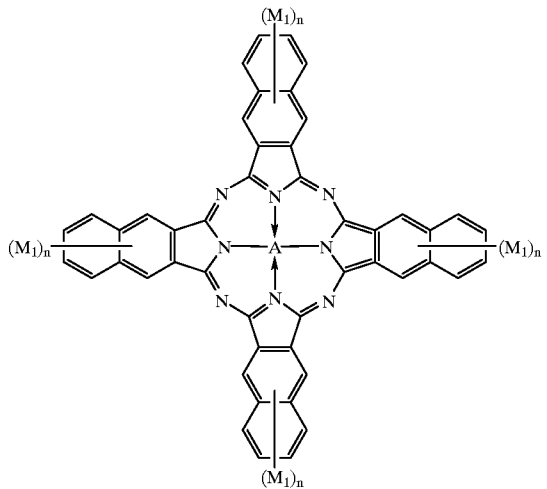

wherein n is 1–6;
   wherein A is selected from the group consisting of Al O arylene $(CO_2$ alkyl$)_2$ and Si(Oarylene $CO_2$, alkyl$)_2$; and
   wherein $M_1$ is selected from the group consisting of H, alkyl, O alkyl, O arylene ($CO_2$ alkyl) and S arylene ($CO_2$ alkyl); said alkyl is independently selected from the group consisting of $C_4$–$C_{18}$ straight or branched alkyl and wherein said phthalocyanine and naphthalocyanine have at least two alkyl groups selected from the group consisting of $C_{12}$–$C_{18}$ straight or branched alkyls.

2. The thermal transfer ribbon of claim 1 wherein said printing media layer further comprises a visible marking compound.

3. The thermal transfer ribbon of claim 1 further comprising a second printing media layer wherein first printing media layer comprises at least one visible marking compound and/or at least one second near infrared fluorescent compound and said second printing media layer comprises said at least one near infrared fluorescent compound.

4. The thermal transfer ribbon of claim 3 wherein said first printing media layer is coated on said ribbon backing element in a specific configuration.

5. The thermal transfer ribbon of claim 1 further comprising a second printing media layer comprising at least one visible marking compound and/or at least one second near infrared fluorescent compound.

6. The thermal transfer ribbon of claim 5 wherein said first printing media layer is coated on said ribbon backing element in a specific configuration.

7. The thermal transfer ribbon of claim 1 wherein said ribbon comprises at least three print media layers serially coated on said ribbon backing element.

8. The thermal transfer ribbon of claim 7 wherein at least one print media layer comprises at least one visible marking compound.

9. The thermal transfer ribbon of claim 7 wherein at least one printing media layer is coated on in a specific configuration.

10. The thermal transfer ribbon of claim 1 wherein said printing media layer comprises a dispersion of an acetate copolymer, at least one acrylic resin and said at least one invisible NIRF compound.

11. The thermal transfer ribbon of claim 10 wherein said printing media layer further comprises from about 5% to about 15% carbon black dispersed therein.

12. The thermal transfer ribbon of claim 10 wherein said printing media layer further comprises at least one visible marking compound dispersed therein.

13. The thermal transfer ribbon of claim 1 further comprising at least one binder selected from the group consisting of carnuba wax, paraffin wax, candelilla wax, palm wax, beeswax, rice bran wax, gum arabic, poly(α-methyl styrene), epoxy resins, acrylic resins polyethylene oxide, polytetrafluoroethylene wax, polyurethanes, polyethylene waxes, methyl methacrylate resins, styrene-ethylene-butylene block copolymers, ethylene vinyl acetate, ethylene methyl acrylate copolymers, styrene butadiene elastomers, polyketones, amorphous polyester resins, cellulose esters, polyvinyl alcohol, solid fatty acids, amides, 1-octadecanol, sebacic acid, stearamide, behenyl alcohol, stearyl stearamide, casein, high density polyethylene emulsion, carnuba wax emulsion, glycerin, castor oil and mixtures thereof in the media layer.

14. The thermal transfer ribbon of claim 1 wherein said near infrared fluorescent compound is copolymerized into a polymer backbone selected from the group consisting of polyesters, polyurethanes, polyolefins, polyamides, polysulfonamides, polyamines, polysiloxanes, polyacrylates, polyvinylacetates, polymethacrylates, polystyrenes, polysulfides and mixtures thereof.

15. The thermal transfer ribbon of claim 14 wherein said polyester backbone includes a residue from an acid or diol selected from the group consisting of sebacic acid, dodecanedioic acid, terephthalic acid, diethylene glycol, poly (ethylene) glycols, 1,4-butanediol, and combinations thereof.

16. The thermal transfer ribbon of claim 1 wherein said concentration of said infrared fluorescent compound is from about 0.001 weight % to about 1 weight %.

17. The thermal transfer ribbon of claim 1 wherein said near infrared fluorescent compound is $(C_6H_5O)_4$ PcAlOC$_6$H$_3$-3,5-di-CO$_{18}$CH$_{37-n}$.

18. A method for applying a mark comprising at least one invisible near infrared fluorescent compound said method comprising the steps of providing a thermal transfer ribbon comprising a ribbon backing element having coated on one side at least one printing media layer comprising at least one invisible near infrared fluorescent compound of claim 1; and contacting the non-coated side of said ribbon backing element with a heating element so as to contact said printing media layer with a print receiving media under conditions sufficient to thermally transfer an image to said print receiving media.

19. The method of claim 18 wherein said at least one invisible near infrared fluorescent compound is selected from monomeric and copolymerized dye compositions.

20. The method of claim 18 wherein said printing media layer has a concentration of said near infrared fluorescent compound of from about 0.001 weight % to about 1.0 weight %.

* * * * *